Nov. 30, 1926.

A. E. LOEWY 1,608,893

AUTOMATIC STOP

Filed Feb. 2, 1926     2 Sheets-Sheet 1

Inventor:
Aaron E. Loewy,
By   *Jno. Cowsdale*
Attorney.

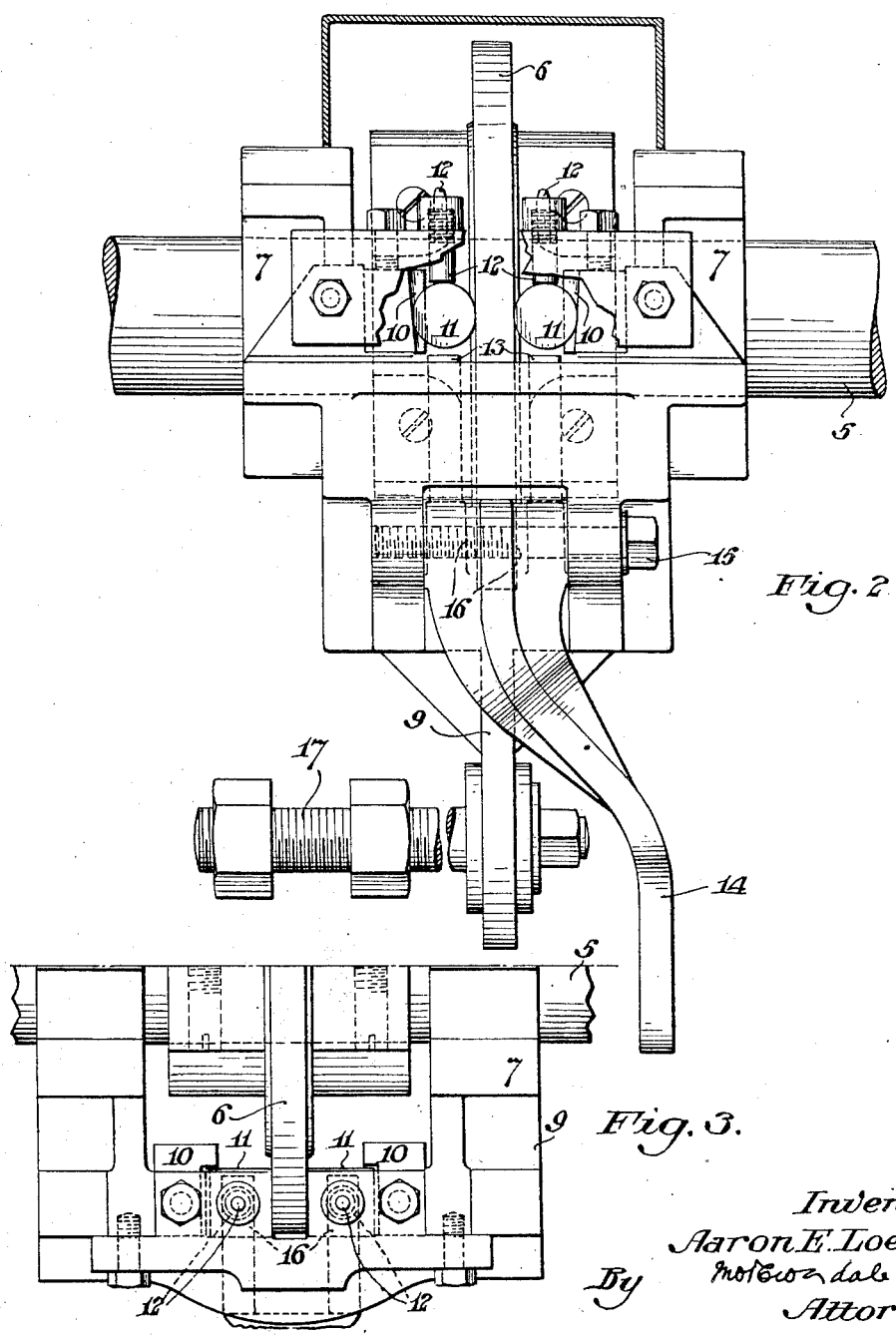

Patented Nov. 30, 1926.

1,608,893

UNITED STATES PATENT OFFICE.

AARON E. LOEWY, OF PHILADELPHIA, PENNSYLVANIA, ASSIGNOR TO LIBERMAN MANUFACTURING COMPANY, A CORPORATION OF DELAWARE.

AUTOMATIC STOP.

Application filed February 2, 1926. Serial No. 85,494.

My invention relates to improvements in automatic stop. The object is to provide improved means whereby an element is free to rotate in one direction but is instantly and automatically prevented from rotating in the opposite direction. The invention also comprises convenient means for releasing the stop when it is desired to permit said opposite rotation.

The invention is especially directed to providing means for withstanding excessive strains.

Referring to the drawings which illustrate merely by way of example suitable means for effecting my invention.

Fig. 2 is a front elevation.

Fig. 3 is a partial plan view.

Similar numerals refer to similar parts throughout the several views.

Figure 1:
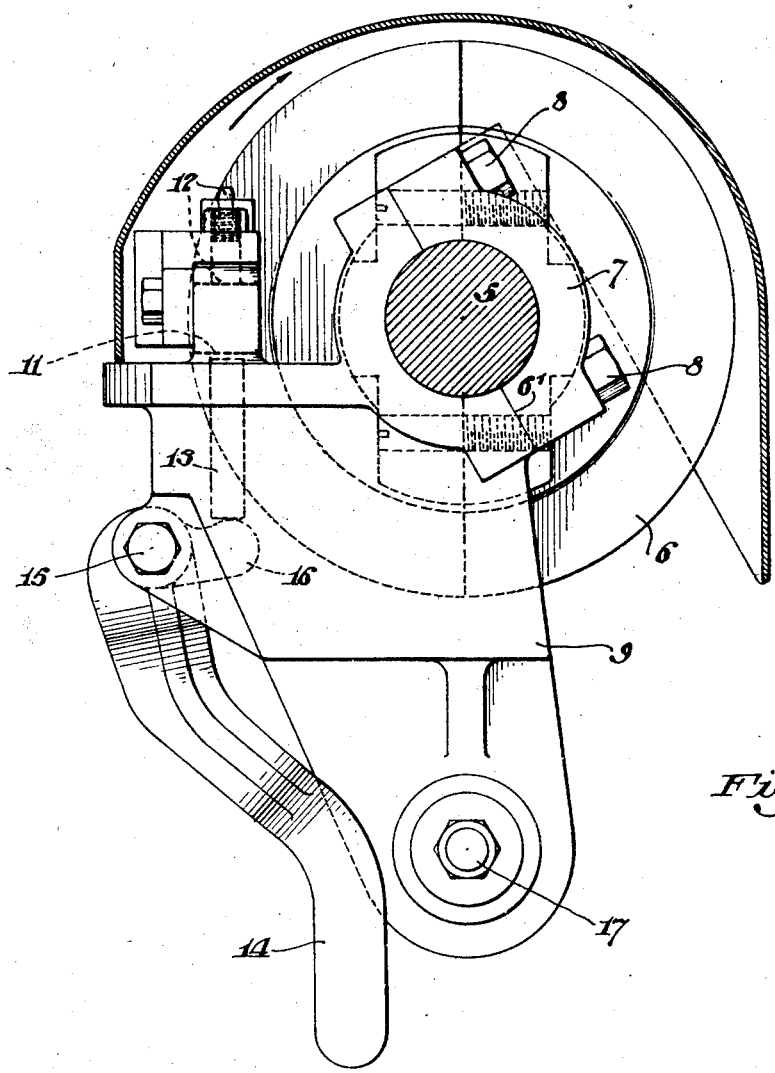
Fig. 1 is a side elevation, parts being broken away.

The rotating element which is adapted to be controlled is the shaft 5 upon which is mounted the disc 6, provided with the hub 7. The disc and hub are split into two parts on the line 6', the parts being secured together upon the shaft 5 by the bolts 8. The engagement is such that the disc is clamped rigidly upon the shaft 5. This is accomplished by providing the opening between the hub sections of slightly less diameter than that of the shaft. The shaft 5 is journalled in the frame or bracket formation 9, mounted on the clamp stud 17. This bracket formation is provided with the flanking tapered recesses or ways 10, one margin of each recess being formed by one side of the disc 6. Within these recesses or ways are seated the rollers 11. These rollers have parallel axes at right angles with the axis of the disc. Each roller is in diameter greater than the width of one end of its tapered way and in diameter less than the width of the other end of said way. A spring plunger 12 tends normally to urge each roller 11 toward the narrower end of its way, while the plungers 13, arbitrarily operated by the hand lever 14 are adapted to move the rollers toward the wider end of said ways. The bifurcated hand lever 14 is pivotally mounted at 15 and has the two projecting arms 16 adapted to engage the lower ends of plungers or pins 13 for their simultaneous operation.

In operation, it will be noted that when the shaft 5 and disc 6 rotate in the clockwise direction the rollers 11 will tend to move toward the wider ends of the ways 10 and thus permit the free rotation of disc and shaft. If however the shaft and disc should start to rotate in the opposite or counterclockwise direction, the rollers 11 immediately move toward the narrower ends of recesses or ways 10 and thus clamp the disc securely against rotation. The important feature of this action is, that the rollers 11 clamp the disc 6 in such way as to exert even and oppositely directed pressures upon the disc, so that the strains are balanced, and there is no tendency to distortion.

What I claim is:—

1. The combination of a rotating element, means forming with the opposite sides of the rotating element, tapered recesses, rollers in said recesses, of diameter greater than the width of one end and less than the width of the other end of its recess, and means for normally urging the rollers toward the narrower ends of said recesses, adapted to permit the rotation of the rotating element in one direction and to lock said element against rotation in the other direction.

2. The combination of a rotating element, means forming with the opposite sides of the rotating element, tapered recesses, rollers in said recesses, of diameter greater than the width of one end and less than the width of the other end of its recess, and means for normally urging the rollers toward the narrower ends of said recesses, adapted to permit the rotation of the rotating element in one direction and to lock said element against rotation in the other direction, and arbitrarily actuated means for moving the rollers toward the wider ends of said recesses.

3. The combination of a rotating shaft, a disc rigidly secured thereto, a bracket formation providing recesses flanking the disc and forming in cooperation with the sides of the disc tapered ways, rollers in said ways of diameter greater than the width of the ways at one end and less than the width of the ways at the other end, and means for normally urging the rollers towards the narrower ends of the ways.

4. The combination of a rotating shaft, a disc rigidly secured thereto, a bracket formation providing recesses flanking the disc and forming in cooperation with the sides of the disc tapered ways, rollers in said ways of diameter greater than the width of the ways at one end and less than the width of the ways at the other end, means for normally urging the rollers towards the narrower ends of the ways, and arbitrarily actuated means for moving the rollers toward the wider ends of said ways.

AARON E. LOEWY.